(12) United States Patent
Chen

(10) Patent No.: US 12,176,722 B2
(45) Date of Patent: Dec. 24, 2024

(54) WIRELESS POWER SUPPLY DEVICE AND METHOD APPLIED TO ELECTRONIC LOCK

(71) Applicant: POWERTEK HARDWARE CO., LTD., Taichung (TW)

(72) Inventor: Chung-Yu Chen, Taichung (TW)

(73) Assignee: POWERTEK HARDWARE CO., LTD., Taichung (TW)

( * ) Notice: Subject to any disclaimer, the term of this patent is extended or adjusted under 35 U.S.C. 154(b) by 542 days.

(21) Appl. No.: 17/581,643

(22) Filed: Jan. 21, 2022

(65) Prior Publication Data
US 2022/0255350 A1    Aug. 11, 2022

(30) Foreign Application Priority Data
Feb. 8, 2021    (TW) .................................. 110104755

(51) Int. Cl.
| | |
|---|---|
| *H02J 50/10* | (2016.01) |
| *G06K 19/04* | (2006.01) |
| *G07C 9/00* | (2020.01) |
| *H02J 7/00* | (2006.01) |
| *H02J 50/80* | (2016.01) |
| *H04B 5/26* | (2024.01) |
| *H04B 5/72* | (2024.01) |
| *H04B 5/79* | (2024.01) |

(52) U.S. Cl.
CPC ............ *H02J 50/10* (2016.02); *G06K 19/045* (2013.01); *G07C 9/00309* (2013.01); *H02J 7/0042* (2013.01); *H02J 50/80* (2016.02); *H04B 5/266* (2024.01); *H04B 5/72* (2024.01); *H04B 5/79* (2024.01); *G07C 2009/00634* (2013.01)

(58) Field of Classification Search
None
See application file for complete search history.

(56) References Cited

U.S. PATENT DOCUMENTS 10,789,792 B2 *  9/2020  Grange ................. H04W 12/06

* cited by examiner

*Primary Examiner* — K. Wong
(74) *Attorney, Agent, or Firm* — Sinorica International

(57) ABSTRACT

A wireless power supply device and method applied to an electronic lock is implemented between a power supply unit and a power receiving unit. The power supply unit is connected to an external power source and has a first radio frequency coil and a first wireless communication module. The power receiving unit is connected to an electronic lock and has a second radio frequency coil and a second wireless communication module. When the power supply unit wirelessly transmits the power provided by the external power source to the power receiving unit, the power receiving unit and the power supply unit perform a handshaking process to confirm whether they are paired objects, if yes, the power is allowed to be transmitted to the electronic lock, so that the security of wireless power supply can be improved.

9 Claims, 4 Drawing Sheets

WIRELESS POWER SUPPLY DEVICE AND METHOD APPLIED TO ELECTRONIC LOCK

FIELD OF THE INVENTION

The present invention relates to a wireless power supply technology, and more particularly to a wireless power supply device and method applied to an electronic lock.

BACKGROUND OF THE INVENTION

A conventional wireless power supply device has a power supply unit and a power receiving unit. The power supply unit is mounted to the door frame of a door body, and is connected with an external power source. The power receiving unit is mounted to the door panel of the door body and is connected with an electronic lock. The power supply unit and the power receiving unit are a coil winding structure, which can wirelessly transmit the power provided by the external power source to the electronic lock through electromagnetic induction.

However, there is no signal encryption design between the power supply unit and the power receiving unit, and there is no relevant verification mechanism. In general, the above-mentioned electronic lock is unlocked by energizing. As a result, an intruder can insert a duplicate coil between the power supply unit and the power receiving unit to send power to the power receiving unit. It is very unsafe to directly power on the electronic lock to unlock it.

SUMMARY OF THE INVENTION

The primary object of the present invention is to provide a wireless power supply device and method applied to an electronic lock, which can confirm the correctness of the power source to improve the security of the wireless power supply.

According to one aspect of the present invention, a wireless power supply device applied to an electronic lock is provided. The wireless power supply device is mounted to a door body. The door body has a door frame. The door frame is provided with a door panel. The wireless power supply device comprises a power supply unit mounted to the door frame and a power receiving unit mounted to the door panel. The power supply unit has a first processor. The first processor is electrically connected to a first wireless communication module, a first radio frequency coil and a first power module. The first power module is electrically connected to an external power source for receiving power provided by the external power source. The power receiving unit has a second processor. The second processor is electrically connected to a second wireless communication module, a second radio frequency coil and a second power module. The second power module is electrically connected to an electronic lock.

According to another aspect of the present invention, a wireless power supply method applied to an electronic lock is provided. The wireless power supply method is implemented between a power supply unit and a power receiving unit. The wireless power supply method comprises the steps of: a user operating an external controller to input an unlocking command; the external controller verifying whether the unlocking command is correct or not, if yes, the power supply unit being activated, and power provided by the external power source being transmitted to the second radio frequency coil through the first radio frequency coil using radio frequency identification technology; the second wireless communication module and the first wireless communication module performing a handshaking process to confirm whether they are paired objects while the power receiving unit receives the power through the second radio frequency coil; if it is determined that they are paired objects, the power receiving unit allows the received power to be transmitted to the electronic lock.

In the wireless power supply device and method applied to an electronic lock provided by the present invention, the power supply unit and the power receiving unit will first confirm whether they are paired objects, if so, the power is allowed to be transmitted to the electronic lock. Therefore, even if an intruder uses a duplicate coil to forcibly supply power to the power receiving unit, the power receiving unit will not transmit the power to the electronic lock, thereby improving the security greatly.

DETAILED DESCRIPTION OF THE PREFERRED EMBODIMENTS

Embodiments of the present invention will now be described, by way of example only, with reference to the accompanying drawings.

Figure 1:
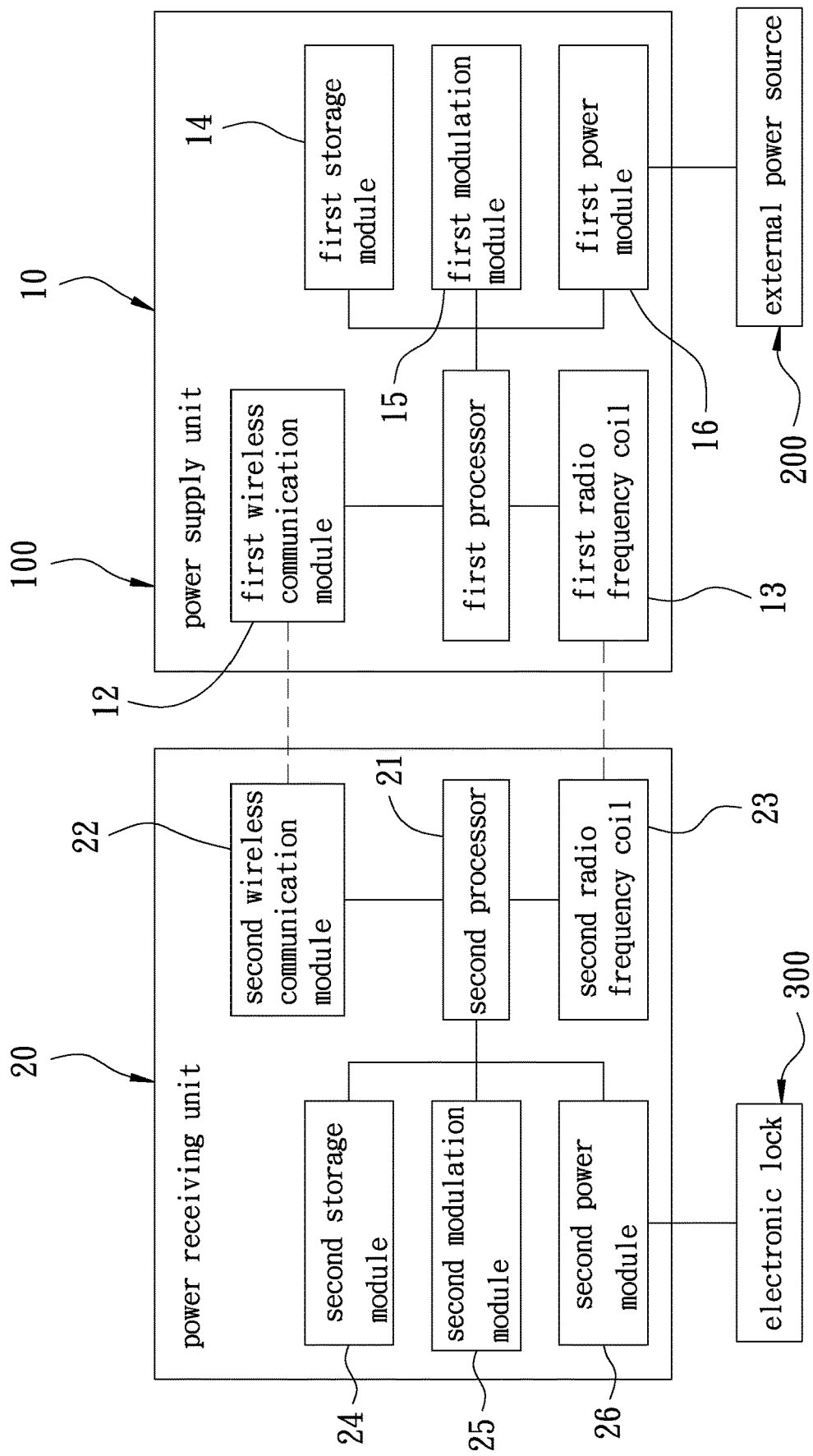
FIG. 1 is a block diagram of a preferred embodiment of the present invention.

FIG. 1 is a block diagram of a preferred embodiment of the present invention. The present invention discloses a wireless power supply device 100, comprising a power supply unit 10 and a power receiving unit 20.

The power supply unit 10 has a first processor 11. The first processor 11 is electrically connected to a first wireless communication module 12, a first radio frequency coil 13, a first storage module 14, a first modulation module 15 and a first power module 16. The first wireless communication module 12 is an infrared transmitter. The first power module 16 is electrically connected to an external power source 200 for receiving power provided by the external power source 200.

The power receiving unit 20 is arranged face-to-face with the power supply unit 10 and keeps a distance from the power supply unit 10. The power receiving unit 20 has a second processor 21. The second processor 21 is electrically connected to a second wireless communication module 22, a second radio frequency coil 23, a second storage module 24, a second modulation module 25 and a second power module 26. The second power module 26 is electrically connected to an electronic lock 300.

Figure 2:
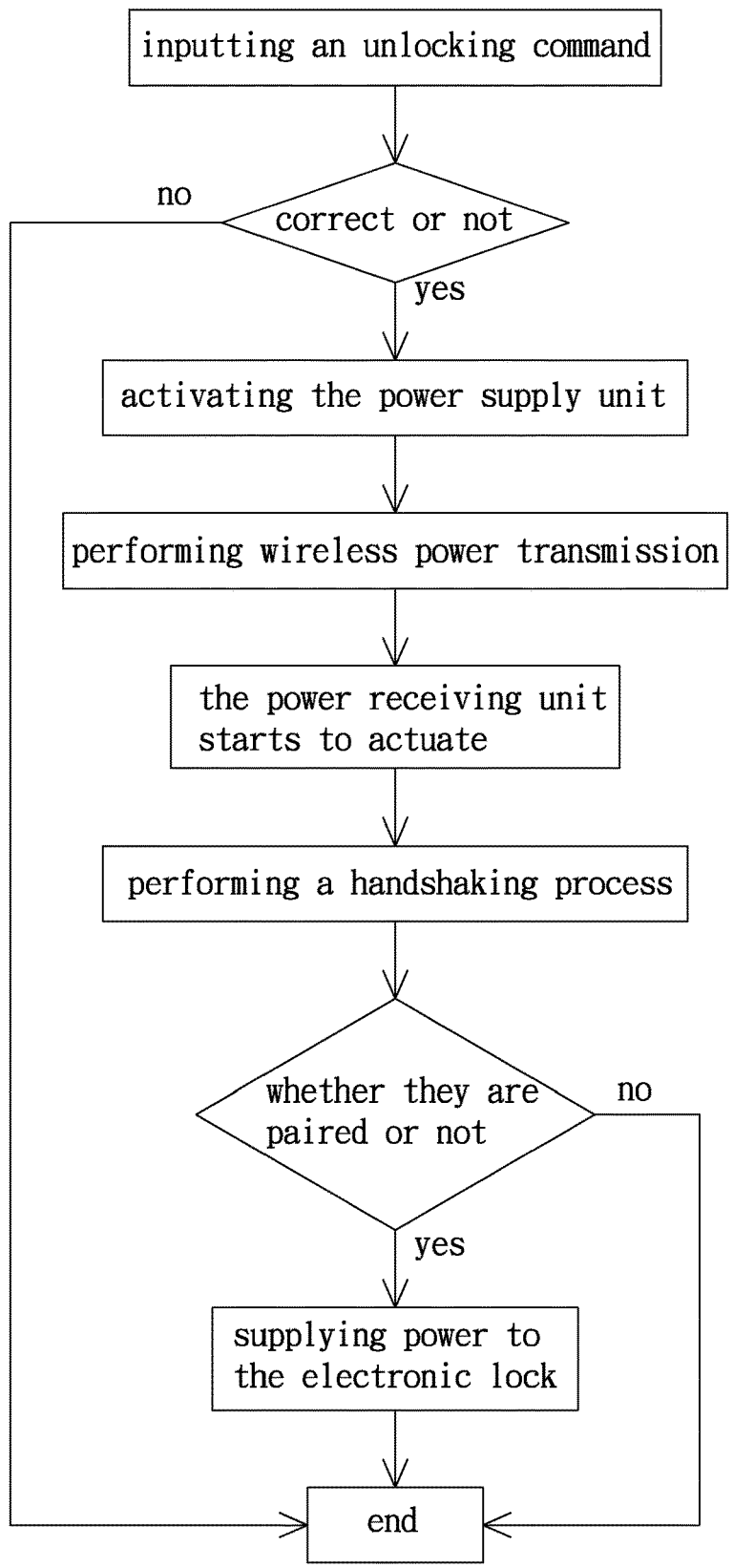
FIG. 2 is a flow chart of the preferred embodiment of the present invention.

FIG. 2 is a flow chart of the preferred embodiment of the present invention. The present invention discloses a wireless power supply method. The wireless power supply method is implemented between the power supply unit 10 and the power receiving unit 20, comprising the following steps:

The user inputs an unlocking command.

An external controller verifies whether the unlocking command is correct or not, if yes, the power supply unit 10 is activated, and the power provided by the external power source 200 is transmitted to the second radio frequency coil 23 through the first radio frequency coil 13 using radio frequency identification technology. The radio frequency identification technology is common knowledge and will not be repeated hereinafter.

The second wireless communication module 22 and the first wireless communication module 12 perform a handshaking process to confirm whether they are paired objects while the power receiving unit 20 receives the power through the second radio frequency coil 23. In this embodiment, the power supply unit 10 and the power receiving unit 20 have been paired with each other by registering identification codes in production, and the pairing information is pre-stored in the first storage module 14 and the second storage module 24. In this way, the power supply unit 10 and the power receiving unit 20 can determine whether they are paired objects by transmitting the identification codes. It is noted that the aforementioned pairing method is only a preferred embodiment, and the protection scope of the present invention is not limited thereto.

If it is determined that they are paired objects, the power receiving unit 20 allows the received power to be transmitted to the electronic lock 300 for driving the electronic lock 300 to actuate.

Figure 3:
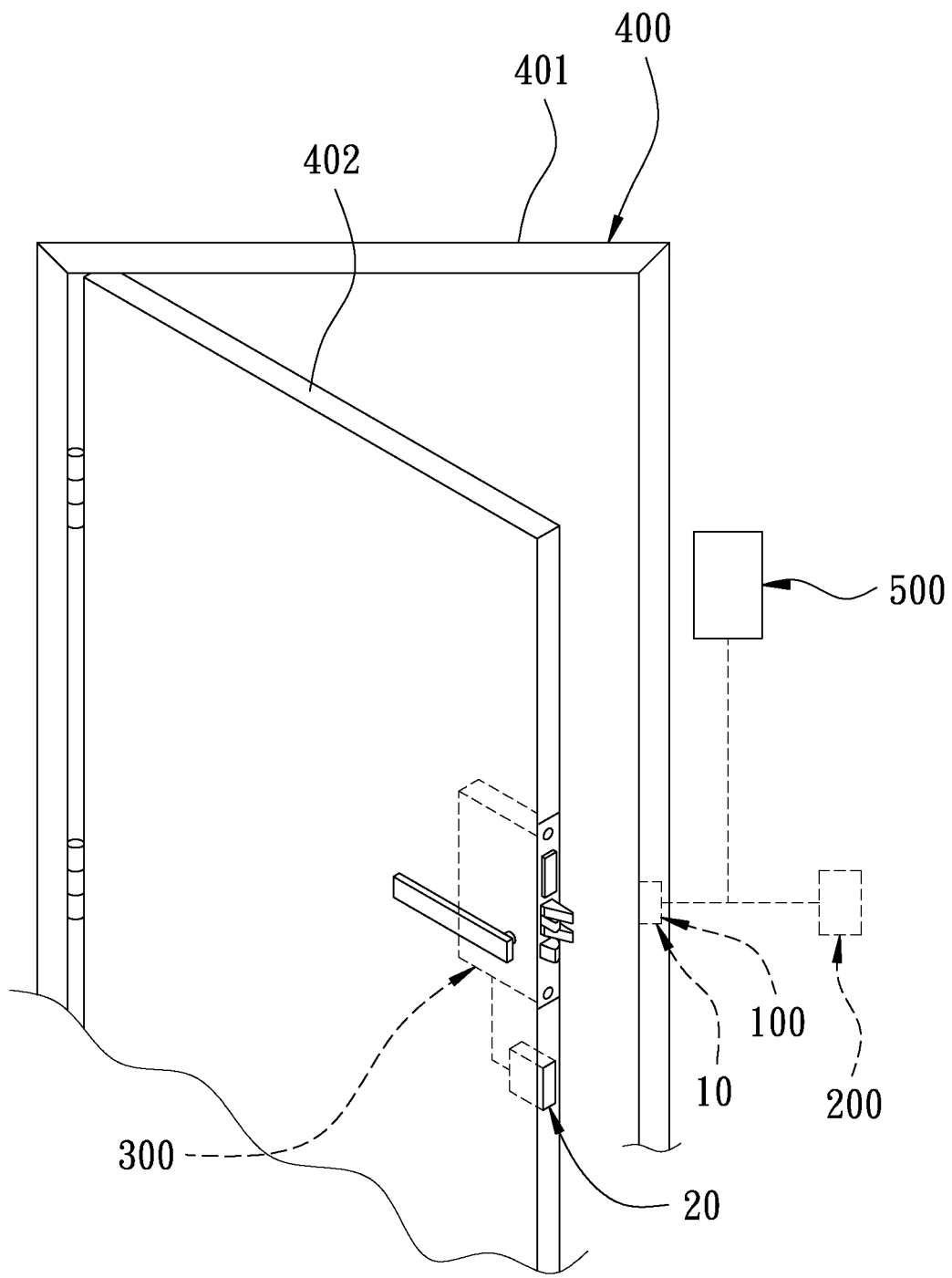
FIG. 3 is a schematic view of the preferred embodiment of the present invention when in use, wherein the door is opened.
Figure 4:
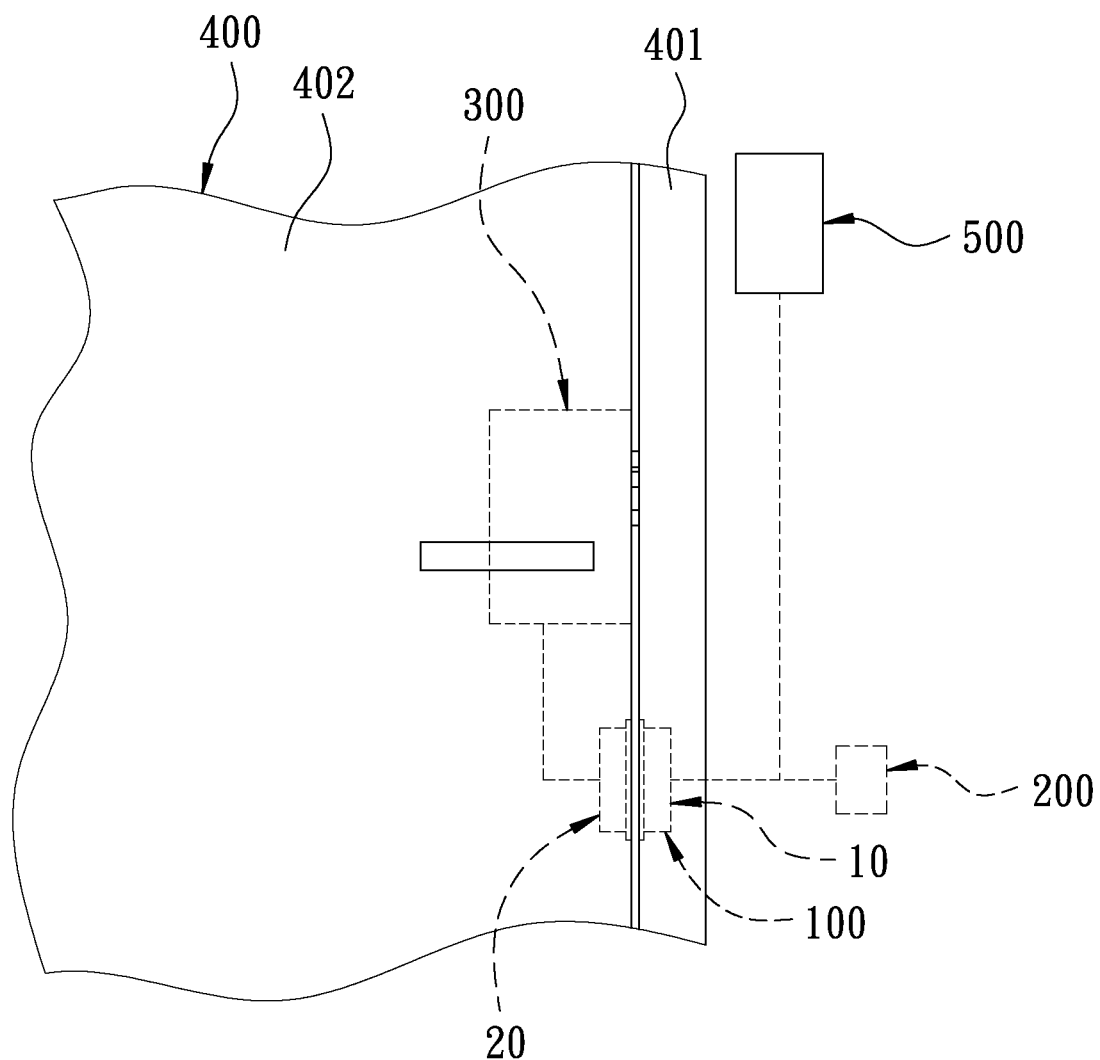
FIG. 4 is a schematic view of the preferred embodiment of the present invention when in use, wherein the door is closed.

FIG. 3 is a schematic view of the preferred embodiment of the present invention when in use, wherein the door is opened. FIG. 4 is a schematic view of the preferred embodiment of the present invention when in use, wherein the door is closed. The wireless power supply device 100 may be mounted to a door body 400. The door body 400 has a door frame 401. The door frame 401 is provided with a door panel 402. The door panel 402 is provided with the electronic lock 300. The door body 400 is provided with an external controller 500. The external controller 500 may be a read head disposed close to the door frame 401 as shown in this embodiment, or a remote wired host, or a read head integrated in the electronic lock. The form and setting position of the external controller 500 are not limited to this embodiment. The power receiving unit 20 is disposed on the door panel 402 at a position corresponding to the power supply unit 10 and is connected to the electronic lock 300.

The common usage of the present invention is described below. When the user operates the external controller 500 to input a correct unlocking command, the external controller 500 will send an unlocking signal to the power supply unit 10. After the power supply unit 10 receives the unlocking signal, the first power module 16 is activated. The power is transmitted to the first radio frequency coil 13 for exciting the first radio frequency coil 13 to induce the second radio frequency coil 23 to generate power. At this time, the power receiving unit 20 starts to operate, and the second wireless communication module 22 and the first wireless communication module 12 perform a handshaking process to confirm whether they are paired objects. If yes, the power transmission between the first radio frequency coil 13 and the second radio frequency coil 23 is allowed to continue, and the power is transmitted to the electronic lock 300 to drive the electronic lock 300 to actuate. If it is determined that they are not paired with each other, for example, the power receiving unit 20 does not receive the signal returned by the first wireless communication module 12, the power receiving unit 20 will refuse to receive the power. If it is determined that they are not paired with each other, for example, if the power receiving unit 20 does not receive the signal sent by the first wireless communication module 12, the power receiving unit 20 will refuse to receive the power. Therefore, even if an intruder uses a duplicate coil to forcibly supply power to the power receiving unit 20, the power receiving unit 20 will not transmit the power to the electronic lock 300, thereby improving the security greatly.

It is worth mentioning that after the power transmission is allowed, while the first radio frequency coil 13 and the second radio frequency coil 23 perform power transmission, power information is added through the first modulation module 15 and the second modulation module 25, so that the power supply unit 10 and the power receiving unit 20 can perform the handshaking process through the power information to adjust the parameters of power transmission in real time. The power information may be a determination of voltage, power or distance from each other, thereby ensuring the power stability of the power supply to each other.

On the other hand, the first wireless communication module 12 and the second wireless communication module 22 are infrared transmitters, which can transmit a larger amount of data. Because the power supply unit 10 and the power receiving unit 20 are disposed between the door frame 401 and the door panel 402 in a face-to-face manner, it is difficult for an intruder to copy the optical signal, so as to prevent the signal from being recorded and cracked effectively.

What is claimed is:

1. A wireless power supply device applied to an electronic lock, mounted to a door body, the door body having a door frame, the door frame being provided with a door panel, the wireless power supply device comprising:
   a power supply unit, mounted to the door frame, the power supply unit having a first processor, the first processor being electrically connected to a first wireless communication module, a first radio frequency coil and a first power module, the first power module being electrically connected to an external power source for receiving power provided by the external power source;
   a power receiving unit, mounted to the door panel corresponding in position to the power supply unit, the power receiving unit having a second processor, the second processor being electrically connected to a second wireless communication module, a second radio frequency coil and a second power module, the second power module being electrically connected to an electronic lock;
   wherein after a user operates an external controller to input a correct unlocking command, the external controller activates the wireless power supply device to start to perform power transmission, wireless power transmission is performed between the first radio frequency coil and the second radio frequency coil using radio frequency identification technology, the power supply unit and the power receiving unit perform a handshaking process through the first wireless communication module and the second wireless communication module to confirm whether they are paired objects, if yes, the power receiving unit allows the received power to be transmitted to the electronic lock.

2. The wireless power supply device as claimed in claim 1, wherein the first wireless communication module and the second wireless communication module are infrared transmitters.

3. The wireless power supply device as claimed in claim 1, wherein the power supply unit has a first storage module, and the power receiving unit has a second storage module.

4. The wireless power supply device as claimed in claim 3, wherein the power supply unit and the power receiving unit are paired with each other by registering identification codes in production, and pairing information is pre-stored in the first storage module and the second storage module, so that the power supply unit and the power receiving unit can determine whether they are paired objects by transmitting the identification codes.

5. The wireless power supply device as claimed in claim 1, wherein the power supply unit has a first modulation module and the power receiving unit has a second modulation module for adding power information while power transmission is performed between the first radio frequency coil and the second radio frequency coil, so that the power supply unit and the power receiving unit can perform the handshaking process through the power information to adjust parameters of power transmission in real time.

6. A wireless power supply method applied to an electronic lock, implemented between a power supply unit and a power receiving unit, the power supply unit being connected to an external power source and having a first radio frequency coil and a first wireless communication module, the power receiving unit being connected to an electronic lock and having a second radio frequency coil and a second wireless communication module, the wireless power supply method comprising the steps of:

a user inputting an unlocking command;

an external controller verifying whether the unlocking command is correct or not, if yes, the power supply unit being activated, and power provided by the external power source being transmitted to the second radio frequency coil through the first radio frequency coil using radio frequency identification technology;

the second wireless communication module and the first wireless communication module performing a handshaking process to confirm whether they are paired objects while the power receiving unit receives the power through the second radio frequency coil;

if it is determined that they are paired objects, the power receiving unit allows the received power to be transmitted to the electronic lock.

7. The wireless power supply method as claimed in claim 6, wherein the first wireless communication module and the second wireless communication module are infrared transmitters for the power supply unit and the power receiving unit to performing the handshaking process using infrared transmission.

8. The wireless power supply method as claimed in claim 6, wherein the power supply unit and the power receiving unit determine whether they are paired objects by transmitting identification codes.

9. The wireless power supply method as claimed in claim 6, wherein the power supply unit has a first modulation module and the power receiving unit has a second modulation module for adding power information while power transmission is performed between the first radio frequency coil and the second radio frequency coil, so that the power supply unit and the power receiving unit can perform the handshaking process through the power information to adjust parameters of power transmission in real time.

* * * * *